United States Patent
Cucchi

(10) Patent No.: US 9,616,501 B2
(45) Date of Patent: Apr. 11, 2017

(54) APPARATUS FOR FEEDING BARS TO A MACHINE TOOL

(71) Applicant: CUCCHI GIOVANNI & C. S.R.L., Bussero (MI) (IT)

(72) Inventor: Cesare Cucchi, Bussero (IT)

(73) Assignee: CUCCHI GIOVANNI & C. S.R.L., Bussero (MI) (IT)

(*) Notice: Subject to any disclaimer, the term of this patent is extended or adjusted under 35 U.S.C. 154(b) by 85 days.

(21) Appl. No.: 14/759,556

(22) PCT Filed: Jan. 9, 2014

(86) PCT No.: PCT/IB2014/000013
§ 371 (c)(1),
(2) Date: Jul. 7, 2015

(87) PCT Pub. No.: WO2014/108793
PCT Pub. Date: Jul. 17, 2014

(65) Prior Publication Data
US 2015/0360294 A1 Dec. 17, 2015

(30) Foreign Application Priority Data

Jan. 10, 2013 (IT) .............................. MI2013A0028

(51) Int. Cl.
*B23B 13/04* (2006.01)
*B23B 9/00* (2006.01)
(Continued)

(52) U.S. Cl.
CPC ............ *B23B 13/123* (2013.01); *B23B 13/04* (2013.01); *B23B 9/00* (2013.01); *B23B 9/02* (2013.01);
(Continued)

(58) Field of Classification Search
CPC .. B23B 9/00; B23B 9/02; B23B 13/04; B23B 13/10; B23B 13/123; B23B 13/125;
(Continued)

(56) References Cited

U.S. PATENT DOCUMENTS 2,742,656 A 4/1956 Fischer
3,875,830 A * 4/1975 Lechot .................... B23B 13/10
82/125

(Continued)

FOREIGN PATENT DOCUMENTS

DE 4000598 C1 * 4/1991 ............. B23B 13/02
DE 102011015578 A1 * 10/2012 ............. B23B 13/00

OTHER PUBLICATIONS

International Search Report (PCT/ISA/210) mailed on May 22, 2014, by the European Patent Office as the International Searching Authority for International Application No. PCT/IB2014/000013.
(Continued)

*Primary Examiner* — Daniel Howell
*Assistant Examiner* — Ryan Rufo
(74) *Attorney, Agent, or Firm* — Buchanan Ingersoll & Rooney PC

(57) ABSTRACT

An apparatus for feeding bars to a machine tool including an end adjacent a working zone in which a spindle is provided; a drum element, rotatable around an axis; a movable support provided on the drum element for supporting and guiding a bar parallel to the axis. The movable support slidably drivable on the drum element parallel to the axis between a disengagement retracted configuration and an engagement extended configuration. The movable support having telescopic tube configured for being received inside tubular housing and guide for coupling with the spindle. The telescopic tube defines, a cylindrical containing structure configured for enclosing and supporting in a distributed manner (Continued)

a respective bar along the entire supporting zone, so as to prevent the bar from flexing because of the centrifugal actions generated by rotation.

11 Claims, 8 Drawing Sheets

(51) Int. Cl.
  *B23B 13/12* (2006.01)
  *B23B 9/02* (2006.01)
(52) U.S. Cl.
  CPC .......... *B23B 13/125* (2013.01); *Y10T 82/2518* (2015.01); *Y10T 82/2521* (2015.01)
(58) Field of Classification Search
  CPC ............... B23B 13/025; Y10T 82/2518; Y10T 82/2521; Y10T 82/2516
  USPC ............................. 414/745.1–745.3, 0.6, 0.8
  See application file for complete search history.

(56) References Cited

U.S. PATENT DOCUMENTS

| | | | | |
|---|---|---|---|---|
| 4,058,036 A | * | 11/1977 | Austin | .................. B23B 13/123 82/163 |
| 4,875,396 A | * | 10/1989 | Gathings | ................. B23B 13/00 82/124 |
| 5,115,702 A | | 5/1992 | Link | |
| 5,522,689 A | * | 6/1996 | Cucchi | ...................... B23B 7/06 226/165 |
| 5,586,477 A | | 12/1996 | Babuder et al. | |

OTHER PUBLICATIONS

Written Opinion (PCT/ISA/237) mailed on May 22, 2014, by the European Patent Office as the International Searching Authority for International Application No. PCT/IB2014/000013.

\* cited by examiner

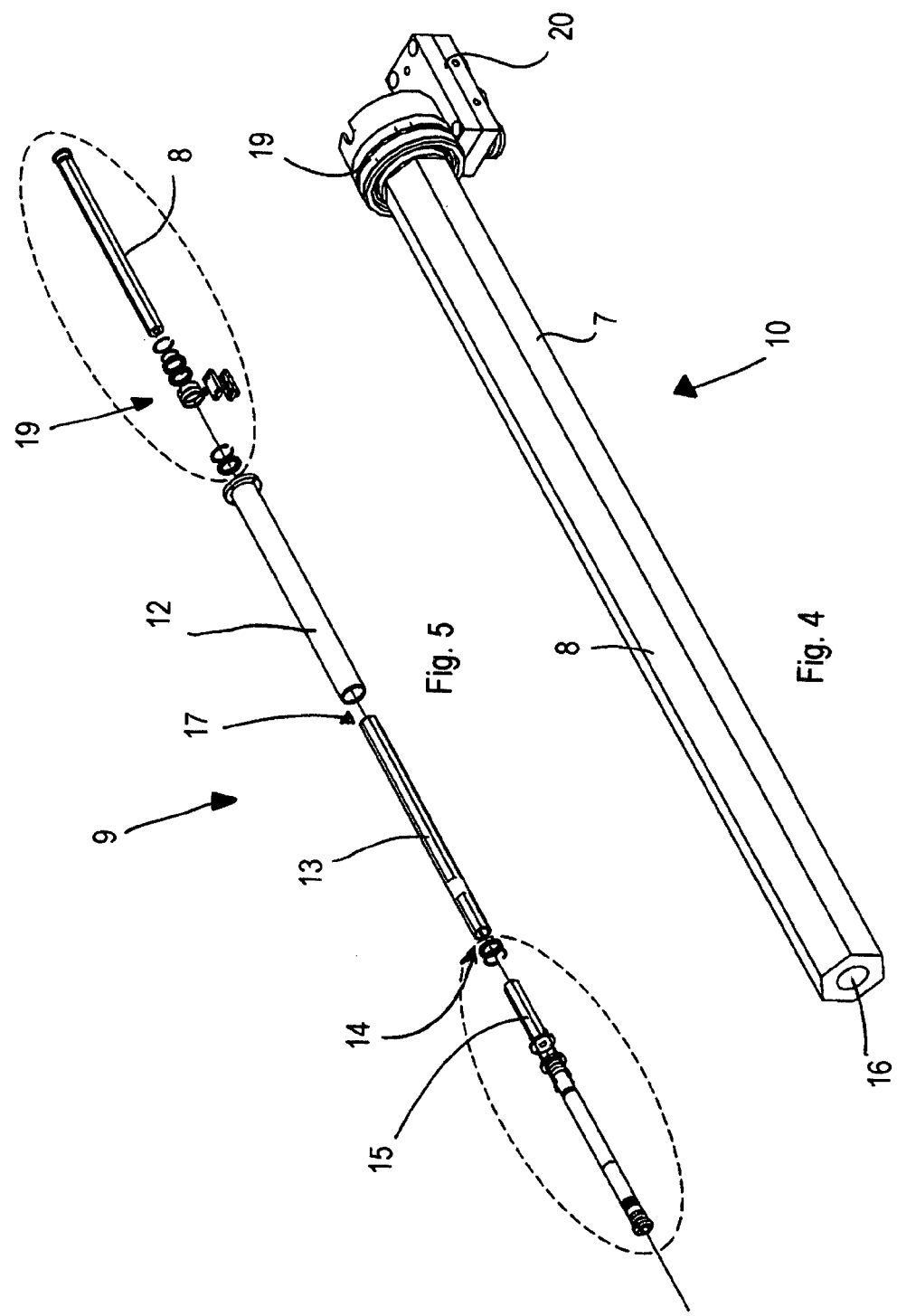

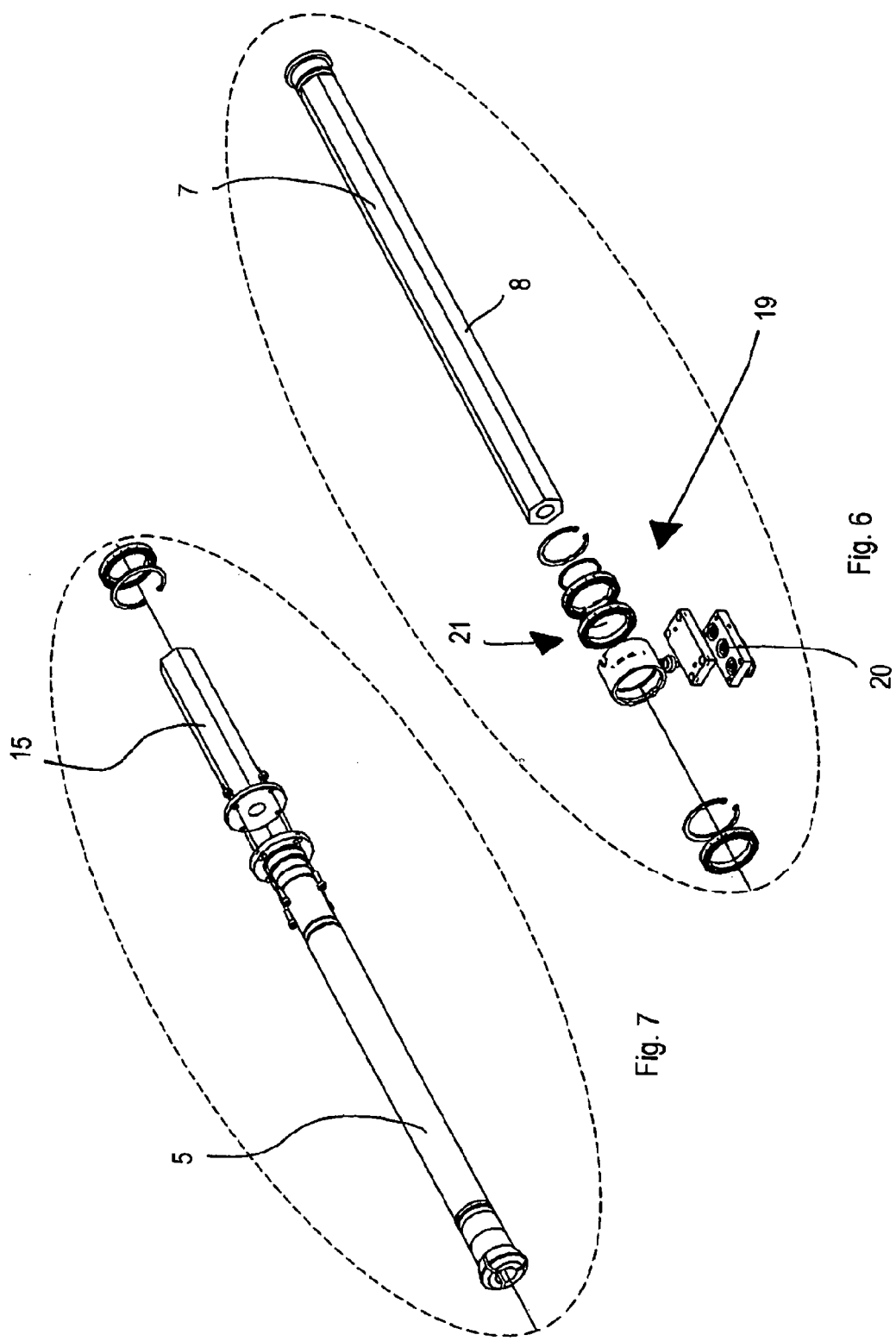

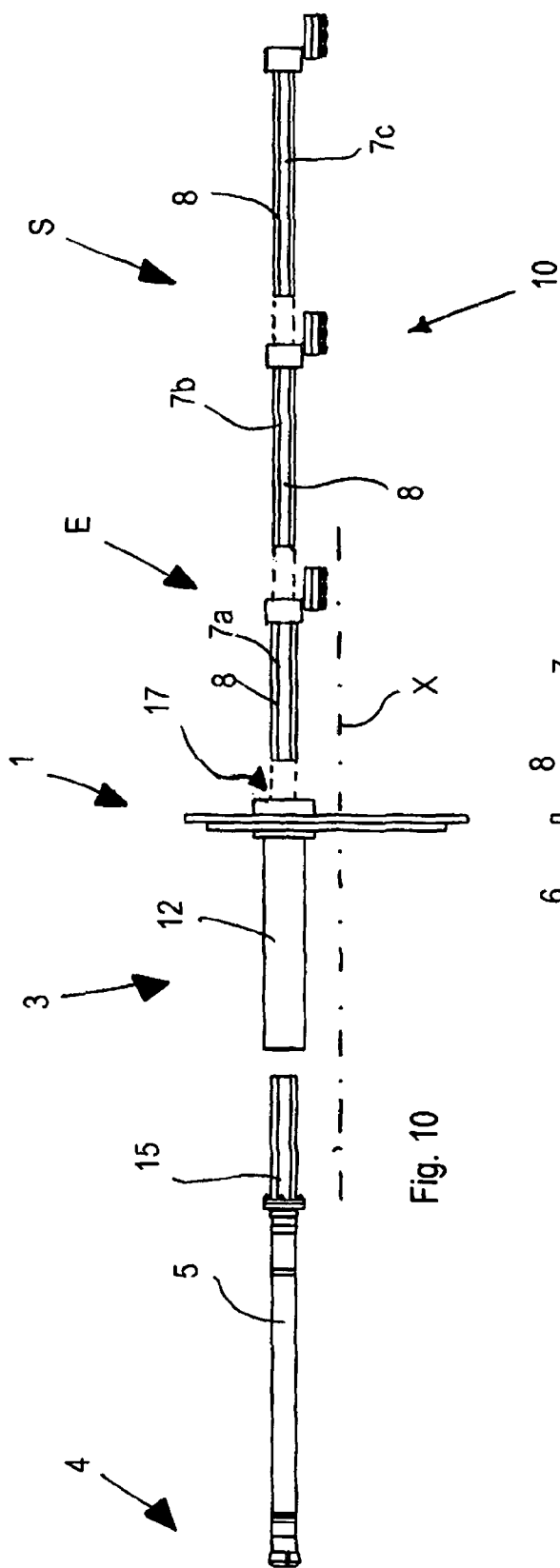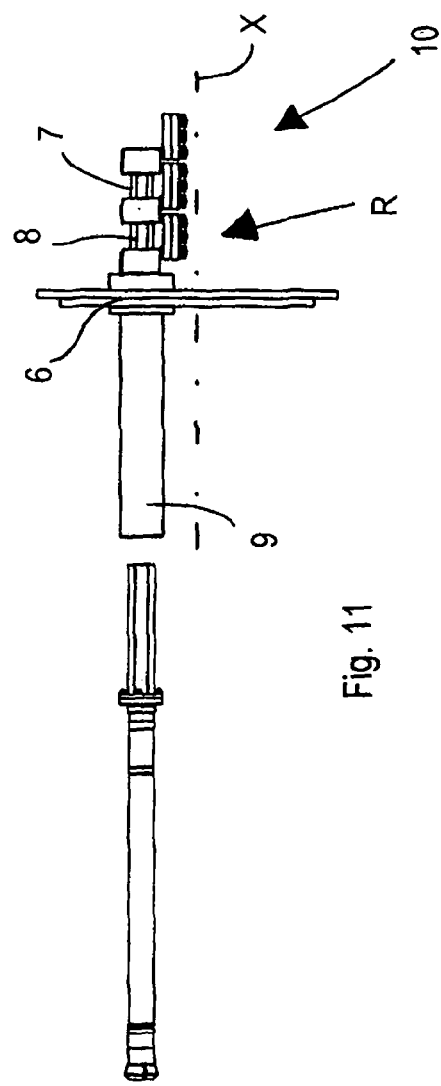
Fig. 10
Fig. 11

APPARATUS FOR FEEDING BARS TO A MACHINE TOOL

The present invention relates to an apparatus for feeding bars to a machine tool, such as, for example, an automatic lathe.

An apparatus is known for automatically supplying bars to the spindle of a lathe, comprising an oblong drum, which is rotatable around a rotation axis, extending from one end to the other of the apparatus and supporting a plurality of guides that are openable for the bars.

The openable guides are distributed both longitudinally along the drum and circumferally on the latter. Each openable guide comprises a fixed part, i.e. mounted in a stationary position on the drum, and a part that is transversely movable with respect to the longitudinal axis of the drum. The movable part, by suitable mechanisms, is first moved away from and then moved again close to the respective fixed part so as to enable a bar to be inserted that has to be guided during machining. A plurality of bar-pushing members is also provided that are supported in an axially movable manner on a rear portion of the aforesaid elongated drum, each bar-pushing member being arranged to push, towards the lathe, a respective bar along a respective group of aforesaid longitudinally aligned openable guides.

A drawback of the aforesaid known apparatus is that during operation it is affected by significant vibrational phenomena, which are above all due to the rotation of the bars. Further, the machining precision of the bars is compromised at high spindle rotation speeds because of the flexure phenomena the bars encounter through the centrifugal effect that is due to the rotation thereof. Another drawback is the significant friction that is generated between the bars and the supporting guides. A further drawback of the aforesaid known apparatus is that it is rather structurally complex, thus entailing rather a high manufacturing cost. The particular configuration given by the drum that is very extended in length, on which many members and the numerous openable guides are mounted, causes problems linked to dynamic stress and vibrations during operation, which imposes lower operating speeds. This also entails structural reliability problems that are followed by expensive maintenance interventions. A possible replacement of parts such as the openable guides or other components requires very laborious operations accompanied by inevitable machine downtime, with consequent financial losses for the user.

An object of the present invention is to improve known apparatuses for feeding bars to machine tools.

A further object is to provide an apparatus for feeding bars to a machine tool that eliminates the flexure effects to which the rotating bars are subject by significantly reducing or even eliminating the vibrational phenomena during machining, and which enables friction with the bars being machined to be avoided.

A further object is to provide an apparatus for feeding bars to a machine tool that has a simplified structural configuration with respect to known apparatuses, that is economically advantageous to manufacture and maintain and which reduces the machine downtime that is due to possible replacement of mechanical parts.

The above can be achieved by an apparatus for feeding bars to a machine tool as defined in claim 1.

Owing to the invention, the aforesaid drawbacks are overcome.

In particular, the apparatus according to the invention, with an extremely simplified structural configuration with respect to prior art apparatuses, enables to prevent any waving and flexure phenomena of the bars that can thus be guided and supported very precisely, with great advantages from the point of view of machining quality. Further, the friction between the apparatus and the bars during rotation of the latter is eliminated. Owing to the structural configuration of the apparatus according to the invention, a significant reduction of moving masses during operation is achieved, so there is a consequent conspicuous reduction of undesired vibrations, and thus great structural reliability is achieved. This implies a reduction of required maintenance and of machine downtime if a component of the apparatus has to be dismantled and reassembled or replaced.

Further features and advantages will be clear from the appended claims and from the description.

The invention can be better understood and implemented with reference to the attached drawings, which illustrate two embodiments thereof by way of non-limiting invention, in which:

FIG. 4 shows movable supporting means of the apparatus according to a first embodiment;

FIG. 5 shows, according to an exploded view, the movable supporting means of FIG. 4 together with spindle means and a tubular housing and guiding means;

Figure 1:
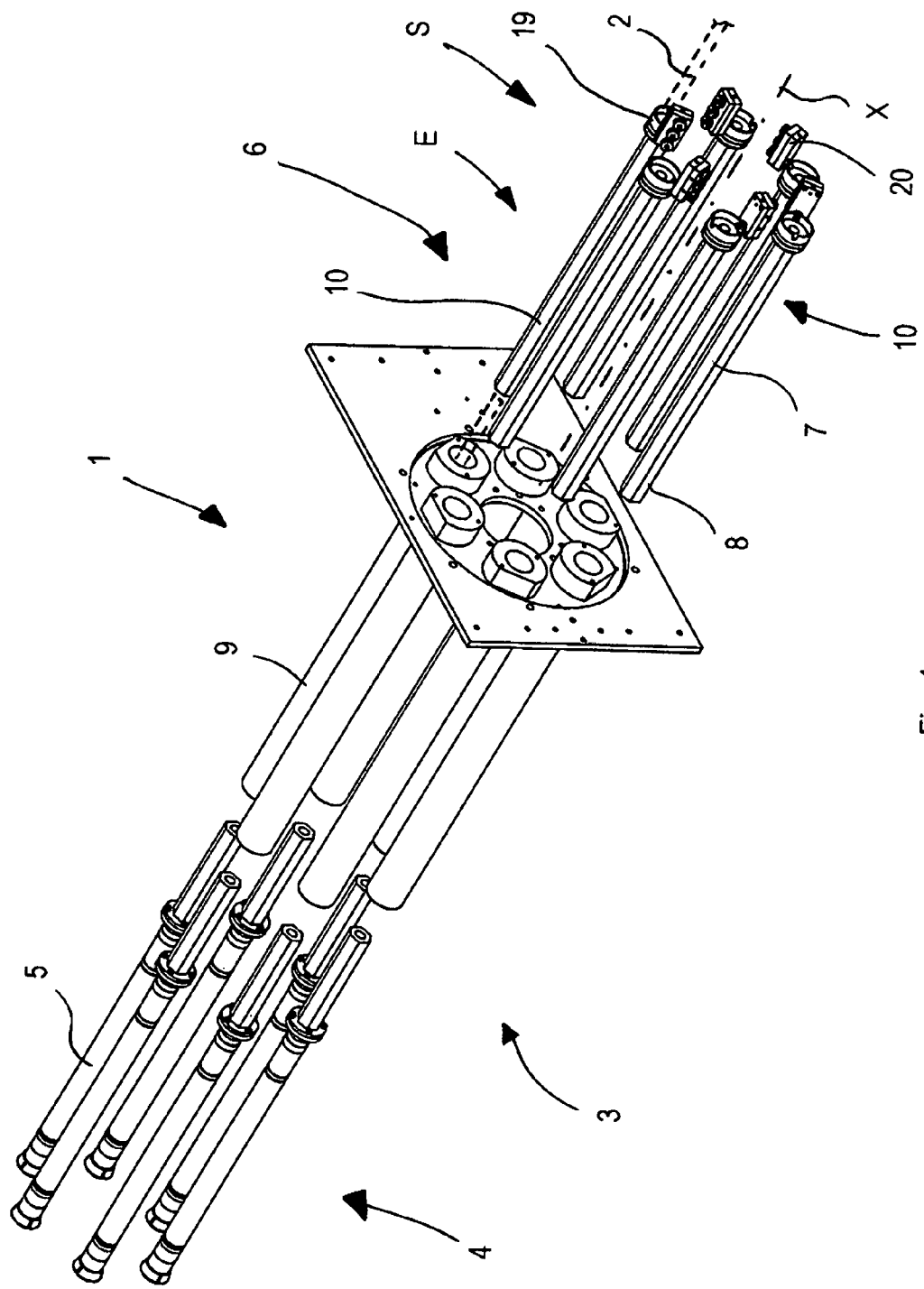
FIG. 1 is an exploded perspective view of a first embodiment of the apparatus according to the invention, in which for the sake of clarity certain parts have been removed, such as a housing and protection casing.
Figure 2:
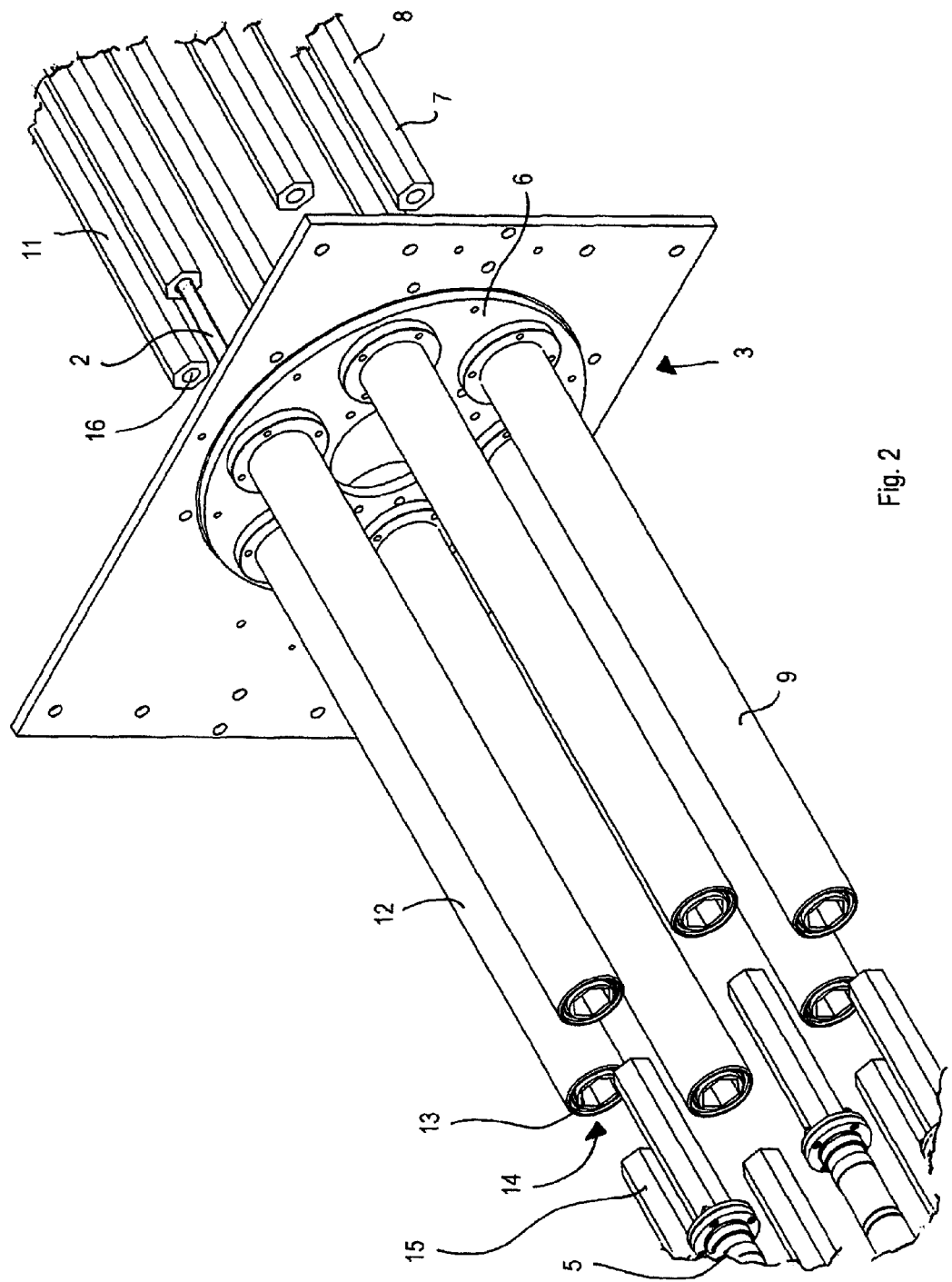
FIG. 2 is another enlarged perspective view of a part of the apparatus in FIG. 1.
Figure 3:
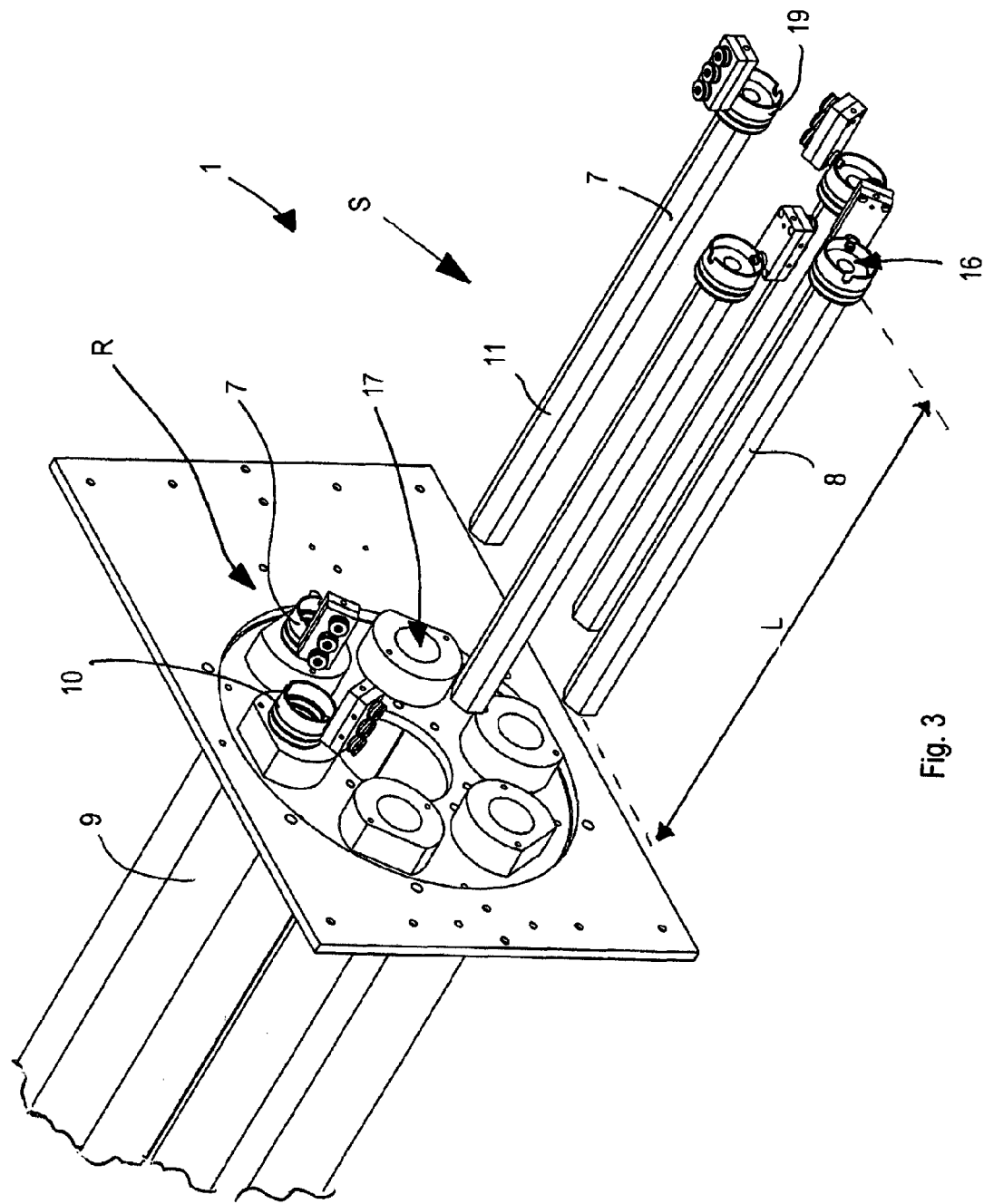
FIG. 3 shows the apparatus in FIG. 1 with movable supporting means in a disengagement retracted configuration.
Figure 8:
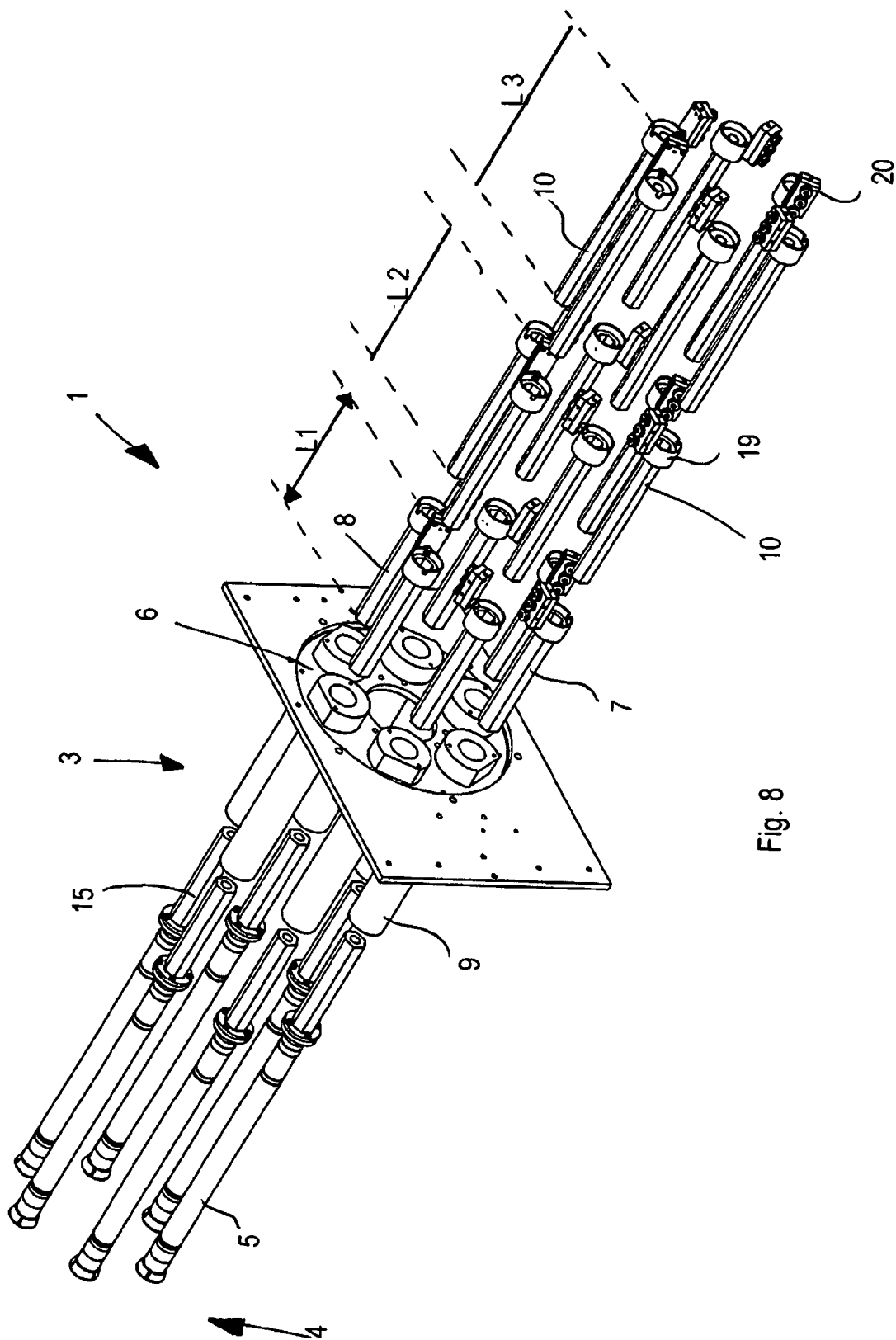
Figure 9:
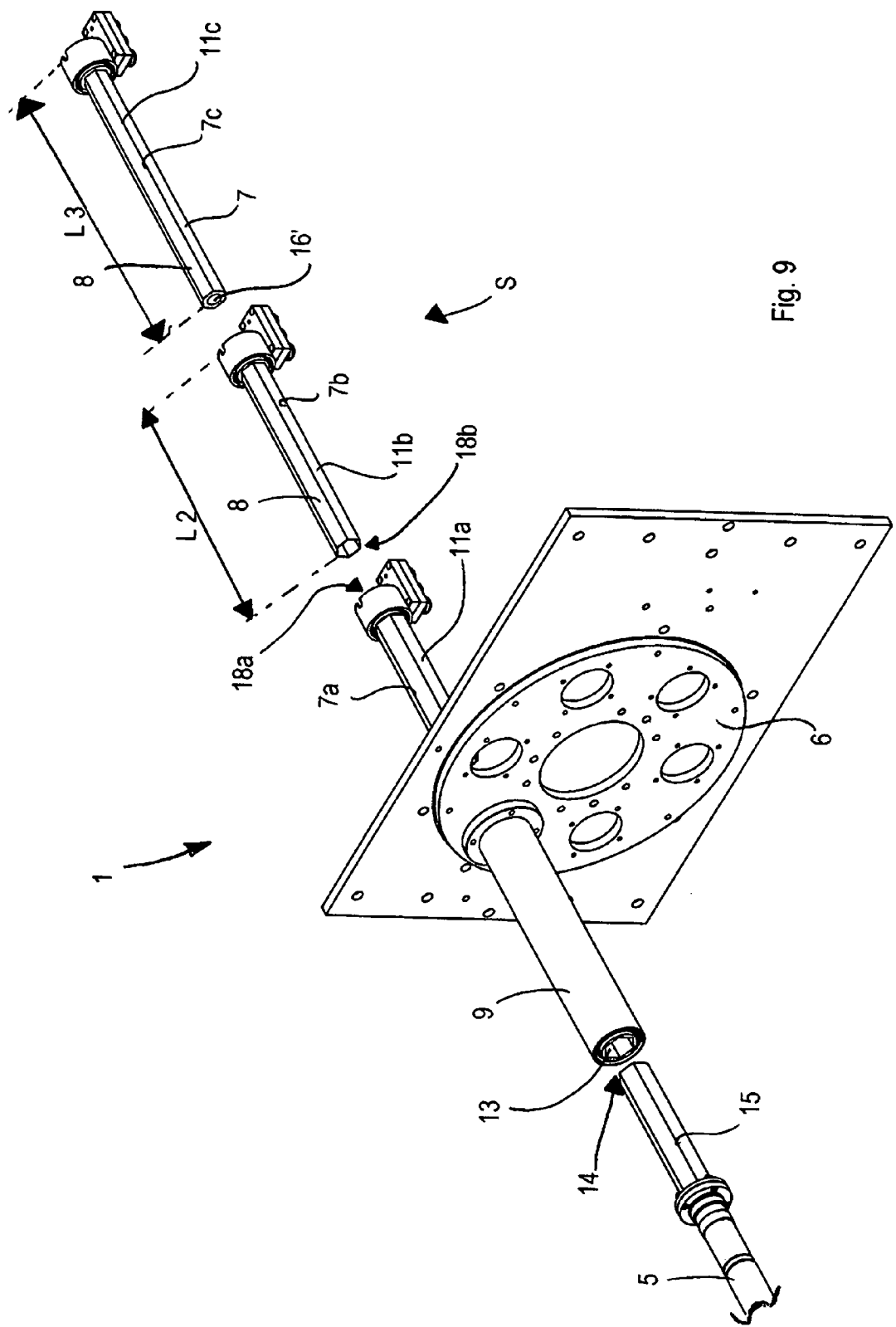

an enlarged detail of the apparatus of FIG. 1 in a first operating position;

FIGS. 6 and 7 are respective enlarged details of FIG. 5;

FIG. 8 is an exploded perspective view of a second embodiment of the apparatus according to the invention;

FIG. 9 is an exploded view in which the second embodiment of the movable supporting means is visible together with spindle means and a tubular housing and guiding means;

FIG. 10 is another exploded view that shows the second embodiment of the movable supporting means;

FIG. 11 shows the second embodiment of the movable supporting means in the disengagement retracted configuration.

With reference to the attached figures, an apparatus 1 is shown for feeding bars 2 automatically to a machine tool, in particular to a lathe that may be of the single-spindle or multiple spindle type.

In particular, the apparatus 1 is mounted on a supporting frame and is provided with a cover and protection casing that is not shown in the figures, for simplicity of exposition and description. The apparatus 1 extends parallel to a longitudinal axis that during operation, is arranged parallel to a rotation axis of spindle means 5 to be fed. The apparatus 1 has an end 3 that is suitable for being placed in a position adjacent to a working zone 4 in which the spindle/s 5 of the lathe is/are provided.

The apparatus 1 comprises, near the end 3, a very compact drum element 6, rotatable around a rotation axis X, and on which movable supporting means 7 are mounted that are suitable for supporting and guiding a bar 2 that is parallel to the rotation axis X. The movable supporting means 7 are slidably drivable on the drum element 6 parallel to the rotation axis X between a disengagement retracted configuration R, in which the movable supporting means 7 are gathered nearer the end 3 to enable a respective bar 2 to be machined to be loaded, and an engagement extended configuration E, in which the movable supporting means 7 are spaced away from the end 3 and are distributed along a supporting zone S, opposite the working zone 4 with respect to the drum element 6, to engage the respective bar 2 to be supported and guided during machining.

The apparatus 1 is provided with stationary guiding and supporting means, that are not shown, configured for supporting a bar 2 in a region upstream of the movable supporting means 7 with respect to an advancement direction of the bars 2 being machined. The apparatus 1 is further provided with advancement means, for example pushing means, for making a respective bar 2 advance along the movable supporting means 7 and to the working zone 4.

In particular, the stationary guiding and supporting means can comprise a stationary guiding and supporting element, of elongated shape, such as a metal profiled section, or "V"-shaped profile element, along which a bar 2 can be rested and slid to be made to advance through the supporting means 7 and towards the respective spindle 5.

The movable supporting means 7 comprise telescopic tubular means 8 configured for being received, in the aforesaid disengagement retracted configuration R, inside tubular housing and guiding means 9 that are mounted on a side of the drum element 6 facing the working zone 4, and that are configured for coupling with the spindles 5. As explained in detail further on, the tubular housing and guiding means 9 contain internally hollow sleeve means 13, configured four coupling with the spindle means 5 for receiving from the latter a rotation motion. As explained better below, the movable supporting means 7 comprises, in addition to the telescopic tubular means 8, also supporting and guiding carriage elements 19 for the aforesaid telescopic tubular means 8. The supporting and guiding carriage elements 19 are drivable by dragging means 20 for being moved from the disengagement retracted configuration R to the engagement extended configuration E and vice versa.

The telescopic tubular means 8, both in a first embodiment and in a second embodiment of the apparatus 1 as disclosed below, define in the engagement extended configuration E a cylindrical containing structure shaped for enclosing and supporting in an extended manner and distributed manner a respective bar 2 along the entire supporting zone S.

The tubular housing and guiding means 9, in particular, comprise one or more external cylindrical elements 12 that extend parallel to the rotation axis X and are integrally connected to the drum element 6. In particular a plurality of cylindrical elements 12 is provided, for example six cylindrical elements 12, circumferally and equally distributed on the drum element 6.

Inside each cylindrical element 12 a respective hollow sleeve element 13 is coaxially housed that can rotate with respect thereto. The sleeve element 13 has a first longitudinal cavity 14 having a polygonally shaped cross section or profile, adapted for coupling with a polygonal bar protrusion 15 of a respective spindle 5 so as to receive from the latter a rotation motion, and be able to rotate within the respective cylindrical element 12, coaxially to the latter. Each hollow sleeve element 13, coupling with the respective spindle 5, rotates together with the latter.

In the first embodiment of the apparatus 1, the movable supporting means 7 define one or more movable supporting units 10, each comprising a single tubular supporting element 7 having a length L. In one possible and non-limiting embodiment, six movable supporting elements 7 are provided that define as many movable supporting units 10 distributed circumferally and uniformly around the rotation axis X.

Each tubular supporting element 7 comprises internally a longitudinal receiving cavity 16 that is suitable for receiving a bar 2, and comprises externally a coupling surface 11. The coupling surface 11 has a polygonally shaped cross section such that is such as to be able to couple with a second longitudinal cavity 17 of the sleeve element 13. The second longitudinal cavity 17 of the sleeve element 13 has a polygonal cross section. Owing to this configuration, when the coupling surface 11 is engaged in the second longitudinal cavity 17, the tubular supporting element 7 receives a rotation motion from the sleeve element 13, which is in turn moved by the polygonal bar protrusion 15 of the spindle 5. In this manner, the tubular supporting element 7 and the bar 2 rotate integrally with one another, e with respect to the cylindrical element 12, which is on the other hand stationary.

Each tubular supporting element 7, as visible in FIG. 1, extends parallel to the rotation axis X with an elongated shape that enables a relevant part of the bar 2 to be contained, especially the part nearest the working zone 4, so as to prevent it from flexing due to the centrifugal effect caused by the rotation imposed by the spindle 5 during machining. The advantageous containing effect provided by the tubular supporting element 7 enables the occurrence of waving phenomena of the bars 2 to be prevented, it being possible to guide and support the bars 2 very precisely, with clear advantages in terms of machining quality. In FIG. 1, the tubular supporting elements 7 are shown according to an exploded view, i.e. spaced apart from the respective tubular housing and guiding means 9. It should be remembered that during operation of the apparatus 1, each tubular supporting element 7, coupled at least partially, i.e. inserted at least partially into the respective tubular guiding and housing element 9, defines an elongated and continuous containing structure, which encloses the bar 2 along the entire supporting zone S and supports the bar 2 in a manner distributed along the bar 2.

The apparatus 1 comprises rotating driving means, such as an electric motor controlled by a control and synchronisation unit, for rotating in an indexed manner the drum element 6 so as to arrange a supporting unit 10 at a time in the required position at a determined spindle 5.

The apparatus 1, as already mentioned above, comprises supporting and guiding carriage elements 19 coupled with respective tubular supporting elements 7.

Each supporting and guiding carriage element 19 is drivable by dragging means 20 so as to enable the respective tubular supporting element 7 to be transferred from the disengagement retracted configuration R to the engagement extended configuration E and vice versa. Each carriage element 19 comprises a cylindrical body, made in a single piece or in several mutually fixed pieces to form a single body, inside which a tubular supporting element 7 is mounted rotatably and coaxially. Between the cylindrical body and the tubular supporting element 7 bearing means are interposed 21 to permit a corresponding precise fluid relative rotation without friction therebetween.

Owing to the aforesaid configuration the friction is significantly reduced or even eliminated that otherwise occurs in prior-art devices. In particular, owing to the fact that the tubular element 7 rotates together with the bar 2, there is no rubbing between the rotating bar 2 and components of the apparatus 1.

The structural configuration of the apparatus 1, which is simplified with respect to the prior art devices, entails significant reduction of moving masses during operation and thus significant reduction of undesired vibrations, thus enabling great operating reliability to be assured. The required maintenance, and the downtime if a component has to be dismantled and refitted or replaced are minimised.

In the second embodiment of the apparatus 1, with reference to FIGS. 8 to 11, the movable supporting means 7 comprise movable supporting means 10 each defined by a plurality of supporting elements 7. Each movable supporting unit 10 thus comprises several movable supporting elements 7 aligned reciprocally and shaped for slidably coupling with one another in a telescopic manner.

More in particular, according to one embodiment presented by way of non-limiting example, each movable supporting unit 10 includes a first 7a, a second 7b and a third 7c supporting element, as more visible in FIG. 9. The first 7a supporting element, which is closer to the end 3, is configured for slidably receiving internally the second 7b supporting element, whilst the second 7b supporting element is configured for slidably receiving internally the third 7c supporting element. The first 7a, the second 7b, the third 7c supporting elements are each provided with a carriage element 19, in a similar manner to what is disclosed above for the first embodiment of the apparatus 1.

The first 7a supporting element comprises externally a first coupling surface 11a that is suitable for coupling with the second longitudinal cavity 17 of a respective sleeve element 13 of a housing and guiding element 9. The first coupling surface 11a has a polygonal cross-section profile that is similar to the cross-section profile of the sleeve element 13. When the first 7a supporting element is inserted into the respective sleeve element 13, it receives from the latter a rotation motion around its axis.

Along the first 7a supporting element a first longitudinal coupling cavity 18a with a polygonal cross section is obtained the function of which is disclosed below.

The second 7b supporting element comprises externally a second coupling surface 11b which also has a polygonally shaped cross section, in particular similar to the first 7a supporting element. The coupling surface 11b is shaped for being received in, and coupling with, the first longitudinal coupling cavity 18a of the first 7a supporting element.

Along the second 7b supporting element a second longitudinal coupling cavity 18b with a polygonal cross-section profile is obtained.

The third 7c tubular supporting element comprises internally a longitudinal receiving cavity 16' that is suitable for receiving a bar 2, and comprises externally a third coupling surface 11c which also has a polygonal cross-section profile that is such as to be able to be received in, and to couple with, the second coupling cavity 18b of the second 7b supporting element.

The first 7a, second 7b and third 7c supporting elements have respectively a first L1, a second L2 and a third L3 length. In particular, the third L3 length is greater than the second L2 length, and the second L2 length is greater than the first L1 length.

Also in this second embodiment of the apparatus 1, each supporting unit 10, defined by three tubular supporting elements 7, defines an elongated cylindrical containing structure parallel to the rotation axis X that is able to contain a significant part of the bar 2, protecting the bar 2 from flexure or waving caused by the rotation imposed by the spindle 5 during machining.

The second embodiment further enables overall dimensions to be reduced further thanks to the multiple telescopic coupling between the three supporting elements 7 of each supporting unit 10. In other words, the three supporting elements 7 in the disengagement retracted configuration R are collapsed into one another, with the respective carriage elements 19 arranged in a "pack" or stack position of reciprocal contact, near the tubular housing and guiding elements 9, mounted on the drum 6. In particular, the carriage element 9 of the first 7a supporting element comes to abut on a respective resting bush mounted on the drum element 6, whilst the carriage elements 9 of the second 7b and third 7c supporting element, approach, or come to abut on one other and on the first carriage element 9.

The tubular housing and guiding means 9, in this second embodiment, have a length that is less than the tubular housing and guiding means 9 of the first embodiment, since also the length of the supporting elements 7 of the second embodiment is less with respect to the first embodiment.

In the engagement extended configuration E, the three supporting elements 7 of each unit 10, in a position in which they are extracted from one another, they define a very extended containing structure that encloses a significant portion of bar 2, thus ensuring an effective, precise and distributed supporting action for the bar 2 being processed.

Suitable connecting means (which are not shown) are provided that are arranged for connecting together the three carriage elements 19 of each supporting unit 10, so as to transfer at least part of a movement of one carriage element 19 to the other, thus enabling the three telescopic supporting elements 7 to approach one another to reach the disengagement retracted configuration C, and enabling the three carriage elements 19 to move away from one another to take the three supporting elements 7 to the engagement extended configuration E.

A storage chamber can be provided to associate with the apparatus 1, in which a plurality of bars 2 can be stored to be fed to the machine tool, and suitable removal and transferring means arranged to remove one bar 2 at a time from the storage chamber to transfer the bar 2 to a stationary guide-support cooperating with the movable supporting means 7 disclosed above.

The removal and transferring means, like also the movable supporting means 7, and the drum element 6 are operationally connected to a control and synchronisation unit that coordinate the various components between them. The control and synchronisation unit acts to arrange a supporting unit 10 one at a time in the disengagement retracted configuration R so as to enable the aforesaid removal and transferring means to be able to load a bar 2 on the stationary guiding and supporting element. Once a bar 2 has been loaded on the stationary guiding and supporting element, the control and synchronisation unit intervenes in order that the carriage elements 19 be arranged in the engagement extended configuration E so that the bar is received in the three supporting elements 7 to be suitably guided and supported.

At this point, the bar 2 is progressively fed to the spindle 5. During machining, the rotation of the spindle 5, owing to the coupling of the polygonal bar protrusion 15 with the sleeve element 13, also entails the rotation of the first 7a supporting element, which is in turn rotatably restrained to the sleeve element 13. The rotation of the first 7a supporting element is also transmitted to the second 7b supporting element and to the third 7c supporting element, which are rotatably restrained to one another and to the first 7a supporting element. As a result, all three supporting elements 7 rotate integrally with the spindle 5 while internally they enclose the bar 2, preventing the bar 2 from flexing. The operation of the apparatus 1 of the first embodiment is similar to that of the second embodiment that has just been disclosed, with the difference that only one movable supporting element 7 of each supporting unit 10 is driven instead of three.

As emerges from what has been disclosed above, in all the embodiments of the apparatus according to the invention, the telescopic tubular means 8 are configured so as to define, in the engagement extended configuration E, an elongated and cylindrical containing structure that is able to enclose and support in a distributed extended and continuous manner a respective bar 2 along the entire supporting zone S.

The containing, guiding and supporting action is thus performed continuously and distributed over very extensive portions of bar, and not discretely on single distinct limited zone discontinuously. The thus defined elongated cylindrical containing structure thus enables the bar 2 to be preserved with greater efficacy from undesired flexing or waving caused by the rotation imposed by the spindle 5 during machining.

As can be inferred from what has been disclosed above, the apparatus 1 advantageously enables each single bar to be guided and supported over its entire length and for the entire feeding path to the working zone 4. This is particularly appreciable when the bars 2 have very reduced cross sections, or are very slender and for this reason subject to flexing during the rotation induced by the spindle. This is avoided owing to the action of distributed and continuous containment performed by the supporting elements 7 that enclose in an extended manner vast portions of bar 2 and accompany and support the bar 2 until complete introduction into the spindle 5 for the entire feeding time.

As can be evinced from what has been disclosed above, the apparatus 1 enables the aims declared above to be achieved. In particular, the apparatus 1, has an extremely simplified structural configuration with respect to prior art apparatuses, and enables any waving and flexing and also vibration phenomena to be prevented. The bars are supported very precisely, with clear advantages in terms of machining quality. Friction between the apparatus and the bars during rotation of the bars is also eliminated, with clear advantages also in terms of noise reduction. The very simple structural configuration of the apparatus according to the invention permits significant reduction of moving masses during operation, thus a great reliability that implies a reduction of required maintenance and machine downtime.

It is possible to configure and dimension the apparatus 1 in a desired manner according to the applications to which the apparatus 1 can be destined, and variations and/or additions are possible to what has been disclosed above and illustrated in the attached drawings.

The invention claimed is:

1. Apparatus for feeding bars to a machine tool, comprising:
    an end suitable for being placed in a position adjacent to a working zone in which spindle means of said machine tool are provided;
    a drum element near said end and rotatable around a rotation axis,
    movable supporting means provided on said drum element and suitable for supporting and guiding a bar parallel to said rotation axis,
    said movable supporting means being slidably drivable on said drum element parallel to said rotation axis between a disengagement retracted configuration, in which said movable supporting means are gathered nearer the end to enable a respective bar, to be machined, to be loaded, and an engagement extended configuration, in which said movable supporting means are spaced away from the end and are distributed along a supporting zone, opposite said working zone with respect to said drum element, to engage said respective bar to be supported and guided during machining,
    wherein it further comprises tubular housing and guiding means for receiving internally said movable supporting means, said tubular housing and guiding means being mounted on the side of said drum element that faces said working zone and being shaped for coupling with said spindle means, and in that said movable supporting means comprise telescopic tubular means and supporting and guiding carriage elements for said telescopic tubular means that are drivable by dragging means for being moved from said disengagement retracted configuration to said engagement extended configuration and vice versa, said telescopic tubular means being configured for being received, in said disengagement retracted configuration, inside said tubular housing and guiding means,
    said telescopic tubular means defining in said engagement extended configuration, an elongated and cylindrical containing structure configured for enclosing and supporting in a distributed extended and continuous manner a respective bar along the entire supporting zone.

2. Apparatus according to claim 1, wherein said cylindrical containing structure extends parallel to said rotation axis with an elongated shape that is suitable for containing at least part of said bar to prevent flexure thereof caused by centrifugal actions generated by the rotation imposed by said spindle means during machining.

3. Apparatus according to claim 1, wherein said tubular housing and guiding means comprise one or more external cylindrical elements parallel to said rotation axis, fixed to and stationary with respect to, said drum element, a hollow sleeve element being rotatably and coaxially housed inside each cylindrical element.

4. Apparatus according to claim 3, wherein said sleeve element has a first longitudinal cavity having a polygonally shaped cross section and is shaped for coupling with a polygonal bar protrusion of said spindle means for receiving a rotation motion from the latter, so as to be able to rotate inside the respective cylindrical element and around a longitudinal axis of the latter.

5. Apparatus according to claim 1, wherein said movable supporting means define one or more movable supporting units, each comprising a single tubular supporting element having a length.

6. Apparatus according to claim 5, wherein said tubular supporting element comprises internally a longitudinal receiving cavity that is suitable for housing a bar, and comprises externally a coupling surface having a polygonally shaped cross section that is such as to be able to couple with a second longitudinal cavity, having a polygonal cross section, of said hollow sleeve element, such as to receive from the latter a rotation motion in an integral way with the respective bar being machined, said rotation motion being imposed on said hollow sleeve element via the coupling with said spindle means.

7. Apparatus according to claim 1, wherein said movable supporting means define one or more movable supporting units, each comprising a plurality of tubular supporting elements axially aligned reciprocally and shaped for coupling slidably with one another in a telescopic manner.

8. Apparatus according to claim 7, wherein each movable supporting unit includes three tubular supporting elements that comprise a first, a second and a third supporting element, said first supporting element being configured for receiving internally said second supporting element and said second supporting element being configured for receiving internally said third supporting element.

9. Apparatus according to claim 8, wherein said first supporting element comprises externally a first coupling surface having a polygonally shaped cross section that is such as to be able to couple with a second longitudinal cavity of said hollow sleeve element included in said tubular housing and guiding means for receiving a rotation motion in a pivotally integral way with said spindle means, said second supporting element comprises externally a second coupling surface having a polygonally shaped cross section that is such as to be able to be received in, and to couple with, a first longitudinal coupling cavity having a polygonal cross section, which is obtained internally in said first supporting element, said third tubular supporting element comprising internally a longitudinal receiving cavity that is suitable for housing a bar and comprising externally a third coupling surface having a polygonally shaped cross section that is such as to be able to be received in, and to couple with, a second longitudinal coupling cavity having a polygonal cross section, which is obtained internally in said second supporting element.

10. Apparatus according to claim 8, wherein said first, said second and said third supporting element have respectively a first, a second and a third length, said third length being greater than said second length, and said second length being greater than said first length.

11. Apparatus according to claim 1, wherein each carriage element comprises a cylindrical body, made in a single piece or in several mutually fixed pieces to form a single body, inside which a respective tubular supporting element is mounted rotatably with interposed bearing means.

* * * * *